United States Patent [19]

Lok

[11] Patent Number: 4,983,866

[45] Date of Patent: Jan. 8, 1991

[54] ENCAPSULATED ARMATURE FOR ELECTRIC MOTOR

[75] Inventor: King K. Lok, Elegant Garden Central, Hong Kong

[73] Assignee: Johnson Electric S.A., La Chaux de Fonds, Switzerland

[21] Appl. No.: 375,320

[22] Filed: Jul. 3, 1989

[30] Foreign Application Priority Data

Jul. 6, 1988 [GB] United Kingdom ............... 8816051

[51] Int. Cl.⁵ ..................... H02K 13/06; H02K 11/00
[52] U.S. Cl. ......................................... 310/43; 29/597; 249/97; 310/235; 425/117
[58] Field of Search ................... 29/597, 598; 249/91, 249/96, 97; 264/272.19, 272.2; 310/43, 44, 45, 233, 235, 236, 261; 425/117, 125

[56] References Cited

U.S. PATENT DOCUMENTS

| | | | |
|---|---|---|---|
| 2,038,419 | 4/1936 | Cotterman | 310/235 |
| 3,098,917 | 7/1963 | Williams | 29/597 |
| 4,588,912 | 5/1986 | Shinmura | 310/43 |
| 4,859,893 | 8/1989 | Wang | 29/597 |

FOREIGN PATENT DOCUMENTS

| | | |
|---|---|---|
| 569748 | 6/1945 | United Kingdom . |
| 1096696 | 12/1967 | United Kingdom . |
| 1124937 | 8/1968 | United Kingdom . |
| 2193045 | 1/1988 | United Kingdom . |
| 2003674 | 3/1989 | United Kingdom . |

Primary Examiner—Steven L. Stephan
Assistant Examiner—D. L. Rebsch
Attorney, Agent, or Firm—Fleit, Jacobson, Cohn, Price, Holman & Stern

[57] ABSTRACT

The armature has windings supported by a core mounted on a shaft. The windings and the wires connecting the windings to a commutator are encapsulated in an insert-molded body of plastic, typically nylon. A ring having radially inwardly extending arms (33) equal in number to the number of commutator slots is mounted on the commutator. The arms are lcoated in respective slots between the commutator segments and are stiff enough to block flow of plastic material along the slots during insert molding of the body of plastic.

6 Claims, 2 Drawing Sheets

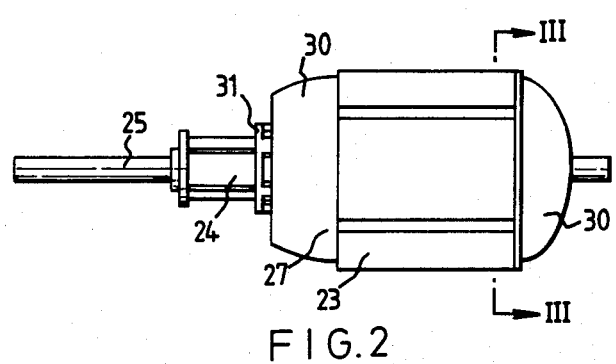
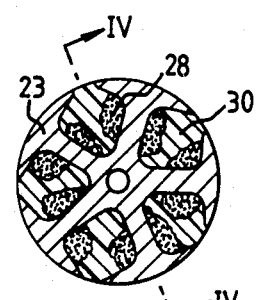
FIG.2  FIG.3
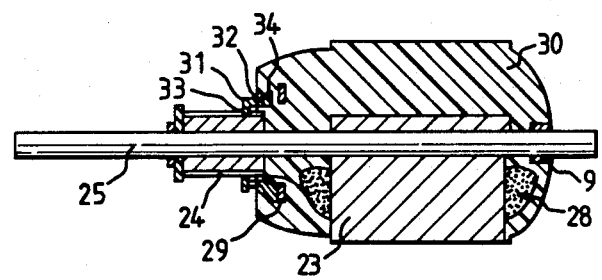
FIG.4
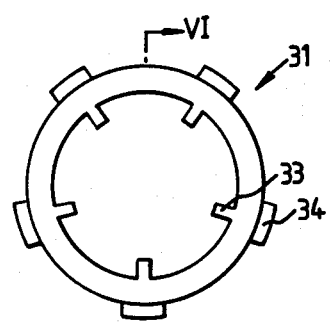
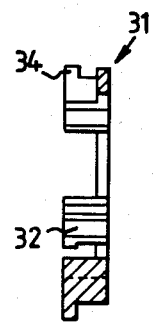
FIG.5  FIG.6

ENCAPSULATED ARMATURE FOR ELECTRIC MOTOR

INTRODUCTION

This invention relates to an armature for an electric motor and to an electric motor provided with such an armature.

BACKGROUND

A conventional armature for an electric motor essentially comprises a core, usually in the form of a lamination stack, a commutator at one end of the core, a spacer at the other end of the core to prevent the windings rubbing against the inside of the motor frame and to fix the length of the motor to give a predetermined end play between supporting bearings, and windings supported by the core and connected by lengths of wire to the commutator. The core, commutator and the spacer are individually mounted as interference fits on the motor shaft commonly with spaces therebetween. Such an armature suffers several drawbacks. Rigidity along the length of the armature is sometimes small, thus allowing the shaft to flex when radial loads are applied to that portion of the shaft outside the motor frame, and also should the armature be out of balance. This flexing reduces the performance of the motor and can lead to complete failure if excessive. Under heavy axial loads movement of, for example, the commutator or spacer along the shaft can cause end play to become excessive. Moreover, torsional strain on the shaft when the armature is used in applications requiring rapid acceleration and deceleration can establish torsional resonances on the armature creating problems of control.

In a conventional armature the forces of acceleration and deceleration when the motor is started or stopped, combined with thermal expansion and contraction of wires due to self-heating, centrifugal forces of rotation, and any external vibrations cause wires lying next to one another to rub together and wear away their insulation layers, thus causing shorting of turns and subsequent loss of performance of the motor. Moreover, the lengths of wire which connect the winding coils to the commutator are suspended in air and having been soldered or welded to the commutator have usually experienced some embrittlement. The forces of acceleration and deceleration, centrifugal force, and external vibrations on these free lengths of wire can cause them to fracture and disconnect the motor.

Moreover, it is not uncommon for localized heating to take place in the windings of conventional armatures causing high temperature rises and failure to occur due to breakdown of insulation.

In a conventional armature, particularly one having an odd number of poles, it is always difficult to ensure an even distribution of the amount of copper in each slot and/or the position of copper in each slot relative to the axis of rotation of the armature. This creates a degree of imbalance resulting in vibration.

It is known to add elements for, inter alia, suppression, which elements are located at or adjacent to the commutator and connected to the commutator or to the wires leading from the winding coils to the commutator. These elements may be fragile and they and the connections to them may suffer serious damage due to the forces of vibration.

Furthermore, in a conventional armature in which joints between the winding wire and the commutator or the aforesaid elements are used some solder flux becomes deposited on surrounding areas. At some time later during operation of the motor this flux may vaporise and recondense on the surface of the commutator or on brush gear causing failure of the motor.

Also, windage losses caused by the drag effect of the uneven slotted surfaces of conventional armature cores and by cavities in the slots themselves can represent a power loss in the motor.

Many of these drawbacks can be removed by encapsulating the windings and the lengths of wire which connect the winding coils to the commutator in a body of plastic. Encapsulation prevents movement between individual turns and wires and thus prevents rubbing or fracture. The body of plastic material also serves to dissipate heat from hot spots in the armature resulting in a more balanced thermal system. It also improves the mechanical balance and rigidity of the armature.

Flush commutators are generally considered to be a bad thing because they can result in increased wear rate of brushes and plastic commonly used to support the commutator segments can be dragged across the commutator segments. It is, therefore, preferred to use a commutator in which slots are provided between the individual commutator segments. However, when encapsulating the windings and lengths of wire which connect the winding coils to the commutator in a plastic body it has been found that plastic material flows along these slots and this is a serious disadvantage.

SUMMARY OF THE INVENTION

According to one aspect of the present invention there is provided an armature for an electric motor comprising a motor shaft, a core mounted on the shaft, windings supported by the core, a commutator mounted on the shaft, the commutator having a plurality of segments with slots therebetween and the windings being connected to the commutator, a body of insert molded plastic encapsulating the windings and wires connecting the windings to the commutator, and means preventing the flow of plastic material along the slots during insert molding of the body of plastic material, the means comprising a plurality of arms which extend into the slots between the commutator segments at an end of the commutator adjacent the windings to block the flow of plastics material along the slots during insert molding of the body of plastic material.

According to another aspect of the present invention there is provided a method of manufacturing an armature for an electric motor, which armature comprises a core supporting windings of the armature and a commutator to which the windings are connected and which comprises a plurality of commutator segments with slots therebetween, wherein the windings and wires connecting the windings to the commutator are encapsulated in a body of plastic material by insert molding and wherein means are provided on the commutator prior to insert molding to prevent the flow of plastics material along the slots during the insert molding of the body of plastic material, said means comprising a plurality of arms which extend into respective slots between the commutator segments at an end thereof adjacent the windings.

BRIEF DESCRIPTION OF THE DRAWINGS

FIG. 2 is a side view of one embodiment of an armature according to the invention, which can be substituted for the armature shown in FIG. 1, FIG. 3 is a section taken along line III—III of FIG. 2, FIG. 4 is a longitudinal section taken along line IV—IV of FIG. 3.

FIG. 5 is a plan view of the plastic ring shown in FIG. 4 for blocking flow of plastic material along the commutator slots, and FIG. 6 is a section taken along line VI—VI of FIG. 5.

DESCRIPTION OF THE PREFERRED EMBODIMENT

Figure 1:
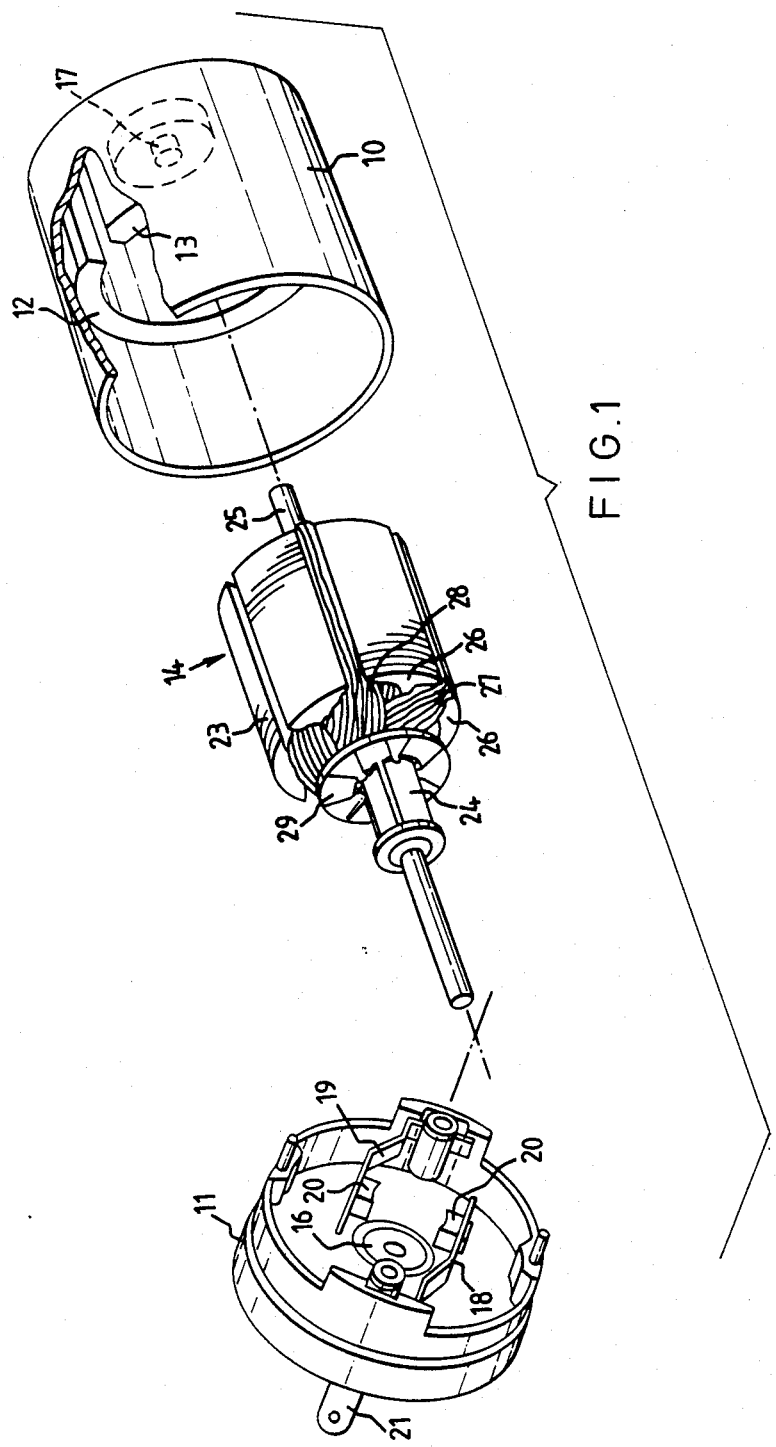
FIG. 1 is an exploded perspective view of a known electric motor, with part of the casing cut away.

Referring firstly to FIG. 1 of the drawings, the motor shown therein is a fractional horsepower permanent magnet direct current motor comprising a cylindrical can-like casing 10 which is closed at one end and a plastic end cap 11, typically of nylon, which is fitted in the other end of the casing. Two stator magnets 12 and 13 are fixed within the casing in conventional manner and an armature 14 is supported for rotation within the casing and between the stator magnets by bearings 16 and 17 mounted, respectively, in the end cap 11 and in the closed end of the casing 10.

The end cap 11 supports two brush leaves 18 and 19, each carrying a carbon brush 20. The brush leaves 18 and 19 are connected to terminals 21 and 22, respectively, which extend through apertures in the end cap 11.

The armature 14 comprises a laminated core 23 and a commutator 24 both of which are mounted as an interference fit on a shaft 25. The core 23 has five (in this example) pole pieces 26 of mushroom-shaped cross-section and is spaced from the commutator 24 along the shaft 25.

Slots 27 between the pole pieces 26 accommodate armature windings 28 which are connected to the segments of the commutator 24.

A spacer 9 is also mounted on the shaft 25 to prevent end turns of the windings 28 from rubbing against the closed end of the casing 10.

A suppression element in the form of a ring-shaped varistor 29 is soldered to each commutator segment.

The construction thus far described is well known in the art.

The armature shown in FIGS. 2 and 3 differs from that shown in FIG. 1 in that the windings 28 are encapsulated in a body 30 of plastics material, such as nylon. The encapsulation process is effected by insert molding, which term is to include compression or injection molding, and the outer surface of the body 30 takes the shape of the mold rather than that of the windings. As shown in FIG. 3, the plastics material fills any unoccupied space in the slots 27 and as shown in FIG. 2 not only encapsulates the windings 28, including end turns thereof, but also encapsulates the varistor 29 and wires which connect the winding coils to the segments of the commutator 24. Indeed, the connections themselves between the wires and the commutator segments are also protected.

A ring 31 (see FIGS. 4, 5 and 6), preferably of plastic, e.g. nylon, is mounted as a close fit on the commutator 24 and has a plurality of equi-angularly spaced axially extending legs 32 equal in number to the number of commutator segments and an axially elongate radially inwardly projecting arm 33 on each leg 32. The ring 31 is fitted on the commutator 24 by sliding it therealong from the free end thereof, with the arms 33 located in respective slots between the commutator segments. Radially outwardly extending feet 34 are provided at the free ends of the legs 32 which extend towards and which may make contact with the varistor 29 and locate the ring axially with respect to the commutator 24. The ring 31 prevents plastics material from flowing into the slots between the commutator segments during injection molding of the body 30. Whilst the legs 32 and feet 34 are not essential it is important that the arms 33 should be stiff enough to withstand the injection molding pressure and block flow of plastic material along the slots.

It is intended that the ring 31 should be retained on the commutator and in the body 30. However, it may be possible to design a ring which could be removed subsequent to molding of the body 30.

As shown, the body 30 has smooth end surfaces which are rotationally symmetrical. However, these end surfaces may be grooved or otherwise made uneven to create air turbulence during rotation of the armature to thereby enhance cooling. Indeed, the body 30 could be shaped so as to create a fan for moving air or pump blades for moving liquids.

Each and every one of the wires are adequately located and all movement thereof prevented by the plastic body 30. Shorted or grounded turns do not therefore occur, nor does fracture of wires connecting the winding coils to the commutator segments.

The body 30 provides an additional heat sink to inhibit the development of hot spots in the windings and furthermore to change the thermal time constant of the armature in a beneficial way.

As shown in FIG. 3 the distribution of wires in the slots 27 differs from slot to slot. This creates a degree of imbalance resulting in vibration as described previously. Plastic material has a higher density than air and the plastic which fills the slots 27, while not entirely eliminating any such imbalance, improves the out-of-balance forces of rotation.

The body 30 also improves the overall rigidity of the armature by integrating the windings 28, the core 23, the commutator 24, and the spacer 9. As a result it may be possible to use a thinner shaft 25. In any event the additional support provided between on the one hand the core 23 and commutator 24 and on the other hand the core 23 and the spacer 9 will prevent axial movement of the commutator 24 and the spacer 9 towards the core 23 if the motor is used under heavy axial loads, e.g. with a worm drive.

The body 30 gives mechanical strength to the suppression element, in this example varistor 29, or indeed any other element encapsulated therein, and encases the soldering flux to prevent vaporization thereof and subsequent recondensation on the commutator or brush gear.

Because all cavities in the armature are filled with plastics material, the surface of the armature will be smoother than that of conventional armatures. The surface of the armature will thus offer less drag resistance with the result that windage losses will be reduced.

If the motor is used for a purpose in which a fluid (i.e. a liquid or gas) is caused to flow through the motor there will be less torque losse in the motor. The smoother contour presented to the gas or liquid creates a lower surface drag and eliminates much of the turbulence normally caused by slotting in the armature core 23. Moreover, there will be less restriction to fluid flow as compared with a conventional armature.

The body 30 may include a pigment to impart a matt black color thereto. In this case, the large surface area of the body 30 will increase the thermal emissivity of the armature.

The body 30 may include one or more of the following additional or alternative additives.

(a) an additive, such as iron powder, to change the permeability of the armature and reduce the reluctance of the motor's magnetic circuit (b) a conductive powder, e.g. copper, to provide a resistive bridge between the segments of the commutator 24. This resistive bridge can be used as a discharge element to release inductive energies created in the winding coils.

(c) an additive, e.g. metallic powder, which could be magnetic or non-magnetic, to improve the thermal conductivity of the plastic body.

The above embodiment is given by way of example only and various modifications will be apparent to persons skilled in the art without departing from the scope of the invention.

What is claimed is:

1. An armature for an electric motor comprising a motor shaft, core mounted on the shaft having pole pieces separated by open slots, windings wound on the pole pieces and partially filling the open slots, a commutator mounted on the shaft and axially displaced from the core, the commutator having a plurality of segments with slots therebetween and the windings being connected to the ends of the segments adjacent the core, a body of insert molded plastic material filling the open slots encapsulating the windings and wires of the windings connecting the windings to the commutator segments, and a ring fitting snugly over the commutator segments adjacent said ends of the segments, said ring comprising a plurality of arms which extend into the slots between the commutator segments, the ring preventing flow of plastic material from the direction of the core towards the commutator and along the slots between the commutator segments during insert molding of the body of plastic material.

2. The armature of claim 1, wherein the ring has a plurality of axially extending legs from which the arms project radially inwards.

3. The armature of claim 1, wherein the plastic material includes an additive to change the permeability of the armature.

4. The armature of claim 1, wherein the plastic material includes an additive to impart a black color thereto.

5. The armature of claim 1, wherein the plastic material includes an additive to improve the thermal conductivity of the body.

6. The armature of claim 1, wherein the plastic material includes an additive which has an ohmic effect.

* * * * *